Figure 1:
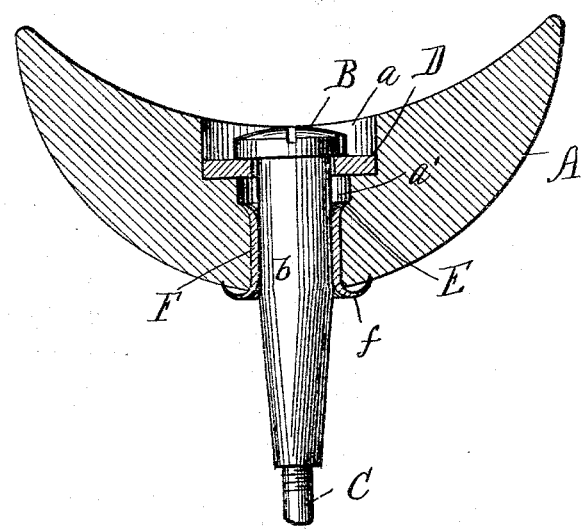

(No Model.)

F. L. GOODRICH.
VEHICLE WHEEL RIM.

No. 546,320. Patented Sept. 17, 1895.

Witnesses
Wm. J. Henning
Wm. M. Rheem

Inventor
F. L. Goodrich
by Elliott & Hopkins
Atty's

UNITED STATES PATENT OFFICE.

FRANK L. GOODRICH, OF BELVIDERE, ILLINOIS, ASSIGNOR TO THE NATIONAL SEWING MACHINE COMPANY, OF SAME PLACE.

VEHICLE-WHEEL RIM.

SPECIFICATION forming part of Letters Patent No. 546,320, dated September 17, 1895.

Application filed December 18, 1894. Serial No. 582,213. (No model.)

*To all whom it may concern:*

Be it known that I, FRANK L. GOODRICH, a citizen of the United States, residing at Belvidere, in the county of Boone and State of Illinois, have invented certain new and useful Improvements in Vehicle-Wheel Rims or Fellies, of which the following is a full, clear, and exact specification.

My invention relates more particularly to wooden or non-metallic rims for velocipede or bicycle wheels; and the improvements have reference to the means for protecting the edges of the perforations through which the spokes or the stems of their taps or nuts pass.

In forming the spoke perforations in wooden bicycle-rims the wood is often splintered or roughened around the edges of the perforations and also on the outer face of the rim, thus affording opportunity for water or moisture to find its way into the interstices of the wood, and, also, by reason of the space between the spoke and the rim to leak through and damage the tap and other interior surfaces, to say nothing of the unfinished and unsightly appearance of the perforations thus splintered about their edges and the wide opening between the spoke and the rim.

In my pending application, Serial No. 520,018, filed August 11, 1894, I have shown and described a means for overcoming these difficulties, which consists of a sheath or lining passing through the perforation and being reamed down at its ends on the face of the rim and the inner washer, respectively. This prior construction is adequate when the rim is constructed of material which is not susceptible to the changes of temperature or moisture, or where the rim is used in a climate which does not cause it to shrink; but it is found that when the rim is constructed of material which undergoes shrinkage after the said sheath has been inserted the further tightening of the spokes from time to time causes the inner end of the spoke or the tap which rests upon the inner end of the sheath to force the sheath outward and cause its outer reamed end to separate from the surface of the rim and afford opportunity for the admission and collection of moisture between the sheath and the sides of the perforation.

The object of my present invention, therefore, is to provide the perforations in the rim with a waterproof sheath or lining which will protect their edges and whose stability will not be affected by tightening the spokes.

With these ends in view my invention consists in certain features of novelty by which such ends and certain other ends hereinafter described are attained, all as more fully described hereinafter with reference to the accompanying drawings, and particularly pointed out in the claims.

Figure 2:
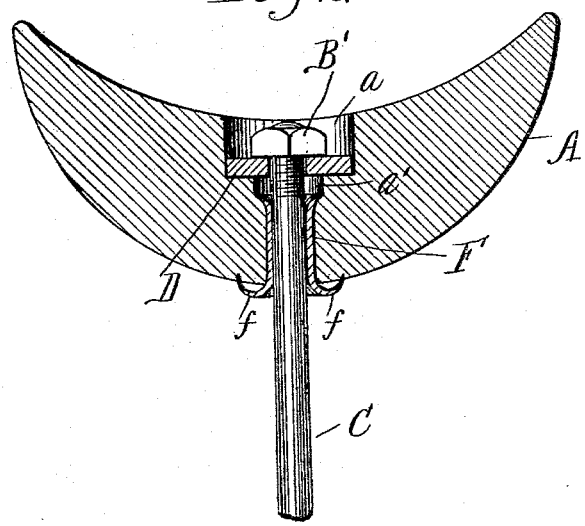

In the said drawings, Figure 1 is a transverse sectional view of a velocipede or bicycle rim provided with my improvements, and Fig. 2 is a similar view illustrating a modification hereinafter described.

Like signs of reference indicate like parts in both views.

A represents an ordinary rim whose convex side may be provided, as usual, with the countersinks $a$, into which are let the heads B of the screw-nuts or taps by which the spokes C are tightened. These countersinks $a$ are provided around the perforations through which the stems $b$ of the nuts pass with washers D, which may be of the usual or any suitable construction, and upon which the heads B take their bearing and are prevented from being pulled through the perforation or sinking into the wood or other material of which the rim is composed.

In the bottom of the countersinks $a$ and over which the washer B projects is a second countersink $a'$, of smaller diameter than the countersink $a$, thus forming a shoulder E around the perforation in the rim a short distance from the washer D. Driven into the perforation in the rim is the metallic or other waterproof sheath F, whose inner end is flaring or reamed down upon the shoulder E, while its outer end is curled or reamed over the edge of the perforation and overlaps the rim, as shown at $f$, the edges of the portion $f$ being forced into the material of the rim so as to preclude absolutely the admission of moisture between the rim and such portion. By this means it will be seen that the sheath through which the stem $b$ passes and in which such stem is snugly jammed is firmly secured in the perforation and held against movement in either direction, while the head or tap B is provided with a firm bearing and is entirely independent of such sheath, so that even though the rim should shrink the stability of the sheath could by no possibility be affected by the tightening of the spokes, but such sheath will permanently remain in the position in which it is fixed with its flaring outer end $f$ firmly in contact with and embedded in the surface of the rim.

The same construction may be employed to advantage with a spoke which passes entirely through the sheath F, and which is secured in place by an ordinary nut B', arranged on the inner side of the rim and bearing upon the washer D, as shown in Fig. 2. The advantage, this form is that the perforations through which the spokes pass need be of but comparatively small diameter and the degree of weakening of the rim resulting from such perforations thus materially diminished.

Having thus described my invention, what I claim as new therein, and desire to secure by Letters Patent, is—

1. The combination with a perforated vehicle wheel rim, of a washer arranged around the inner end of said perforation, a sheath passing through said perforation and having its outer end reamed down upon the face of the rim and its inner end arranged at a distance from said washer and a stem or spoke passing through said sheath and having a head resting upon said washer, substantially as set forth.

2. The combination with a perforated vehicle wheel rim having a counter-sink therein provided with a second counter-sink of smaller diameter, of a washer arranged in said first counter-sink, a sheath passing through said perforation and having its inner end reamed down upon the shoulder of said second counter-sink and being at a distance from said washer, and its outer end turned down against the face of the rim, and a stem passing through said sheath and having a head resting upon said washer, substantially as set forth.

FRANK L. GOODRICH.

Witnesses:
GEO. NASH,
F. A. HOPKINS.